Jan. 3, 1928.
J. D. YODER
1,655,033
APPARATUS FOR TREATING WATER FOR BOILER FEED AND OTHER PURPOSES
Filed July 13, 1921
2 Sheets-Sheet 2
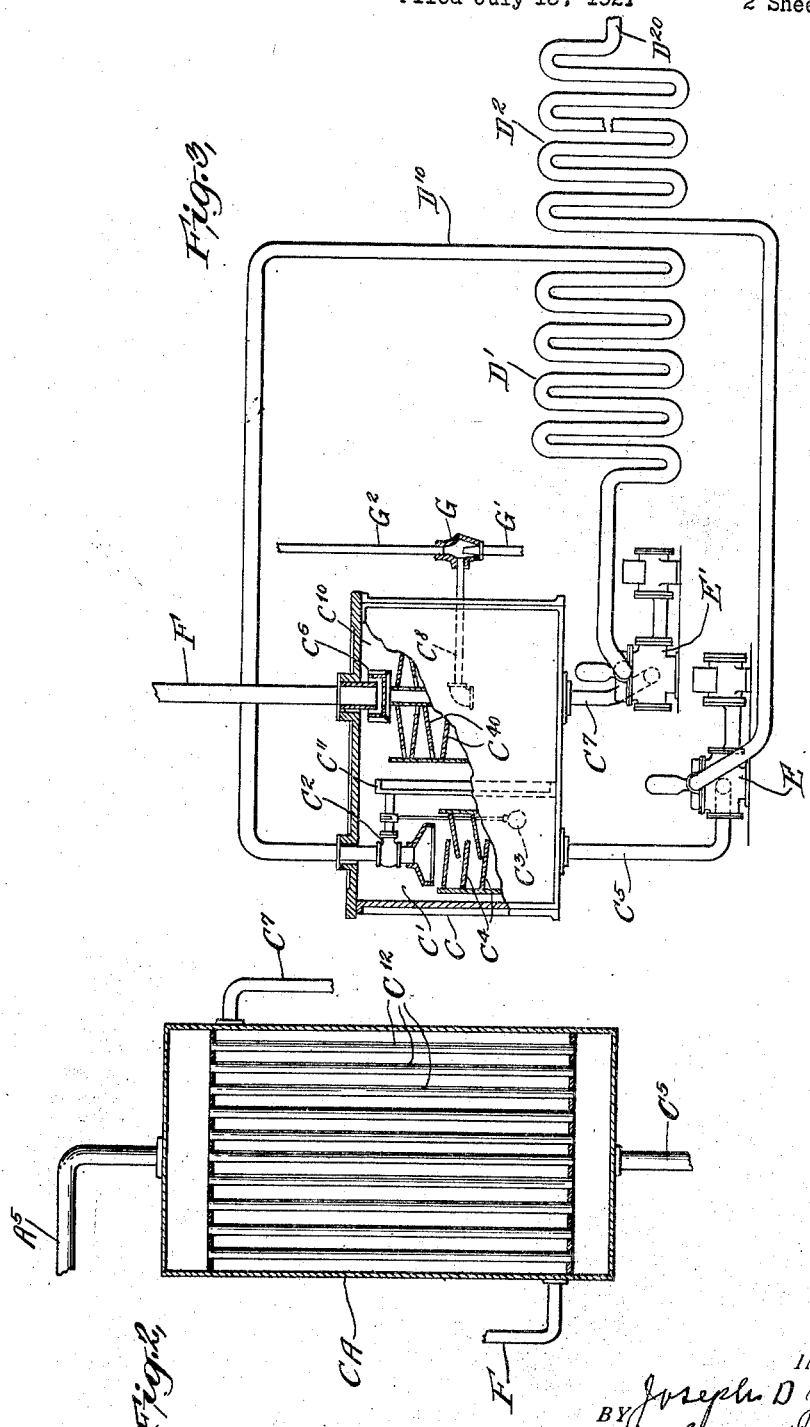

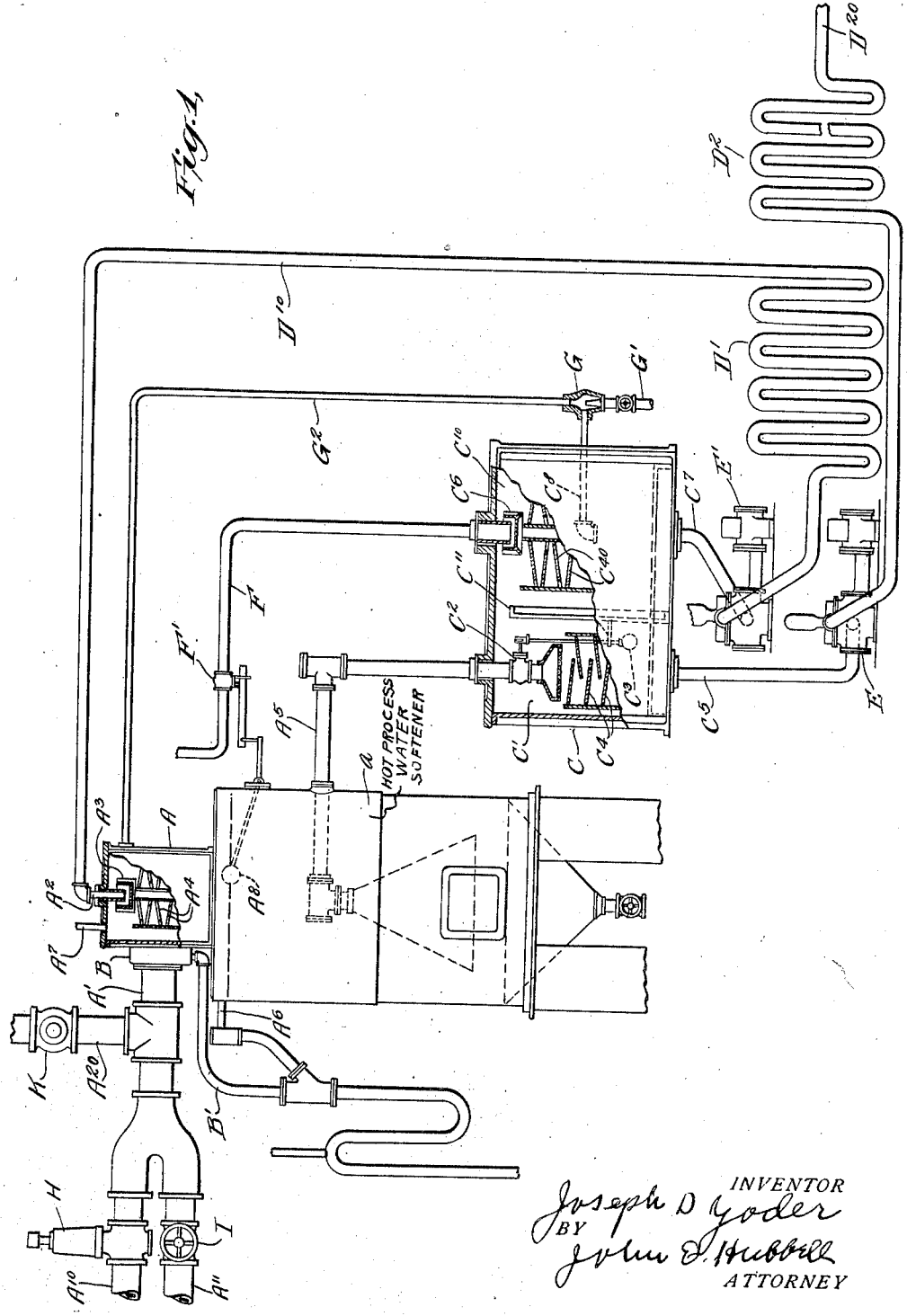

Patented Jan. 3, 1928.

1,655,033

UNITED STATES PATENT OFFICE.

JOSEPH D. YODER, OF PHILADELPHIA, PENNSYLVANIA, ASSIGNOR TO COCHRANE CORPORATION, OF PHILADELPHIA, PENNSYLVANIA, A CORPORATION OF PENNSYLVANIA.

APPARATUS FOR TREATING WATER FOR BOILER FEED AND OTHER PURPOSES.

Application filed July 13, 1921. Serial No. 484,304.

My present invention consists in improved apparatus for heating water for boiler feed and other purposes. In practice the apparatus may advantageously include provisions for not only heating the water, but for subjecting the water to some hot process treatment as to deaerate the water, or both to deaerate it and soften it as by the so-called hot process softening treatment, and the general object of my invention is to provide for the effective use of an economizer as the source of supply of all, or a large portion, of the heat required in heating and treating the water.

A characteristic feature of the invention is the use of an economizer divided into low and high temperature sections in association with a heat exchanger which serves to transfer heat to the water entering the low temperature section of the economizer from the water leaving the low temperature economizer section. With this arrangement the water enters the low temperature section of the economizer at a temperature high enough to prevent sweating and resultant corrosion of the economizer, and the water leaves the low temperature economizer section at a temperature high enough for effective deaeration and hot process softening without requiring any or but little additional heat. The water after traversing the heat exchanger the second time passes to the high temperature section of the economizer which it enters at a relatively low temperature conducive to efficient economizer operation.

Of the drawings:

Fig. 1 is a diagrammatic representation of one form of my invention comprising hot process water softening and deaerating provisions;

Fig. 2 is an elevation of a closed heat exchanger which may be used in lieu of the open heat exchanger employed in Fig. 1; and Fig. 3 is a diagrammatic representation of a form of my invention comprising provisions for heating and deaerating water without other treatment.

In the drawings, and referring first to the construction shown in Fig. 1, A represents a water heater of the open feed water type which is mounted above and is open at its lower end to a decanting tank or settling chamber $a$, such as is employed in the so-called hot process of water purification. $A^2$ represents the water inlet at the top of the heater A, and A' the pipe through which steam may be passed into the heater under some conditions as hereinafter explained. The pipe A' discharges into the heater through the usual separator B provided with an outlet B' for oil and other liquid separating from the steam therein. The water entering the heater at the inlet $A^2$ passes through a distributing trough $A^3$ and thence on to the usual splash trays $A^4$ over which the water flows in film-like and broken streams. $A^5$ represents the service water outlet from tank $a$, and $A^6$ is an overflow connection from the tank $a$. $A^7$ represents an air vent from the heater.

The water outlet pipe $A^5$ discharges into the chamber C' of an open heat exchanger C through a valve $C^2$ controlled by a float $C^3$ which opens and closes the valve $C^2$ accordingly as the water level in the compartment C' falls below or rises to a predetermined maximum. The heat exchanger C comprises a second compartment $C^{10}$ separated from the compartment C' by a partition $C^{11}$ which rises from the bottom of the heat exchanger to a height above the water level maintained in the two compartments but does not extend to the top of the heat exchanger so that the two compartments C and C' are in full communication above the partition $C^{11}$. The water entering the heat exchanger through the pipe $A^5$ is advantageously discharged into the chamber C' in a spray onto baffles or spreader plates $C^4$. The compartment C' is provided with a water outlet at its bottom connected by a pipe $C^5$ to the inlet of a pump E which discharges to the inlet of the high temperature section $D^2$ of the economizer. The outlet pipe $D^{20}$ from the economizer section $D^2$ may lead to a boiler or other apparatus in which the heated and treated water is utilized.

The raw water to be heated and treated is supplied to the upper end of the compartment $C^{10}$ of the heat exchanger C through a pipe F. As shown the flow through the pipe F is regulated by a valve F' controlled by a float $A^8$ in the tank $a$, and the water supplied by the pipe F is discharged within the compartment $C^{10}$ into a trough $C^6$ from which it overflows on to baffles or spreader plates $C^{40}$. The compartment $C^{10}$ is provided with an outlet at its bottom connected by a pipe $C^7$ to the inlet of a circulating pump $E'$. The latter discharges to the inlet of the low temperature section $D'$ of the economizer. The outlet from the economizer section $D'$ is connected by a pipe $D^{10}$ to the inlet $A^2$ of the heater A. The open heat exchanger C is provided with an air outlet connection $C^8$ shown as connected to a steam ejector G. $G'$ represents the steam supply line to the ejector G, and $G^2$ the delivery pipe therefrom which leads to the heater A.

As shown the pipe $A'$ may be supplied with exhaust steam from plant auxiliaries through a branch pipe $A^{11}$ which is provided with a cut-off valve I. Live steam may be supplied to the pipe $A'$ through a branch pipe $A^{10}$ which includes an automatic pressure reducing valve H. $A^{20}$ represents a branch for discharging excess steam to the atmosphere from the pipe $A'$ through the usual back pressure valve K.

In the normal contemplated mode of operation of the apparatus shown in Fig. 1, the raw water is supplied to compartment $C^{10}$ of the heat exchanger C at a rate dependent upon the height of water level in the tank $a$, to which the float $A^8$ is responsive. The water thus supplied to the compartment $C^{10}$ is heated in its passage through the latter by intermingling with steam supplied from the compartment $C'$ as hereinafter explained, and is augmented in amount by the water of condensation formed from the steam by which it is heated. Advantageously the apparatus is so proportioned and operated that the water will leave the compartment $C^{10}$ through the outlet $C^7$ at a temperature somewhat in excess of 120° F., say 132° F., so that the low temperature section $D'$ of the economizer will not be subjected to the sweating and consequent corrosion which would occur if the water were introduced into the economizer at a lower temperature. Advantageously also the apparatus is so proportioned and designed that the water passing from the economizer section $D'$ through the pipe $D^{10}$ to the chamber A will enter the latter at the temperature of something like 220° F. which it is desired to maintain in the chamber A. In case additional heat is required, however, steam is supplied to the heater A through the supply pipe $A'$. This may be exhaust steam furnished by the pipe $A^{11}$ when exhaust steam is available for the purpose, and, when not, it may be live steam supplied from the pipe $A^{10}$ through the pressure reducing valve H which may be set to admit steam to the pipe $A'$ whenever the pressure in the pipe $A'$ is less than that corresponding to the temperature which it is desired to maintain in the heater A. When exhaust steam is available and is supplied in amounts in excess of the heater requirements the surplus is discharged through the branch $A^{20}$ and back pressure valve K in the usual manner. The hot water softening apparatus $a$ operates in the usual manner which is too well known to require description and the softened water leaves the tank $a$ through the outlet $A^5$ at a temperature of say 215° F. slightly lower than the temperature maintained in the heater chamber A. This water after leaving the tank $a$ is subjected to a reduction in pressure on its admission to the compartment $C'$ of the heat exchanger C and in consequence a portion of the water bursts into steam with a consequent reduction in its temperature to that corresponding to the temperature of steam at the pressure existing in the heat exchanger C. This temperature will be that at which the water leaves the compartment $C^{10}$ through the outlet $C^7$ and that at which the water leaves the compartment $C'$ through the pipe $C^5$.

The bulk of the air or other gases contained by the raw water entering the compartment $C^{10}$ of the heat exchanger will be liberated by the heating to which the water is subjected while flowing in film-like and broken streams from the trough $C^6$ onto and over the baffles $C^{40}$. The air and gases thus liberated and the air and gases liberated from the water passing through the compartment $C'$ and which in such passage is freed from all but minute traces of air and gas, are withdrawn from the heat exchanger by the ejector G and forced into the chamber A. This air and gas, and air and gases liberated from the water in the heater A and tank $a$, are discharged from the heater A through the vent $A^7$.

The apparatus shown in Fig. 1 and operated as above described possesses numerous advantages. It provides relatively simple and effective means for softening and deaerating the water with the aid of heat furnished wholly, or mainly, by the economizer. The water is supplied to the low temperature economizer section $D'$ at a temperature high enough as already explained to avoid sweating and corrosion troubles, and at a temperature low enough for the effective utilization of the relatively low temperature gases by which this section of the economizer would ordinarily be heated. Furthermore the reduction in temperature of the water supplied to the high temperature section $D^2$ of the economizer from the temperature required for effective deaeration and purification augments the capacity of the high temperature economizer section $D^2$ to transmit heat from the gases passing over it into the water passing through it. The practical efficiency of an economizer, as is well known, decreases markedly with a relatively slight increase in the temperature at which the water enters the economizer.

In lieu of the open heat exchange C shown in Fig. 1 I may employ a closed heat exchanger such as the tubular heat exchanger CA shown in Fig. 2. The water delivered to the heat exchanger CA through the pipe $A^5$ and passing from the heat exchanger to the pipe $C^5$ running to the high temperature economizer section, flows through the tubes $C^{12}$ of the exchanger, while the raw water supplied by the pipe F passes from the latter through the intertube space of the exchanger to the pipe $C^7$ running to the low temperature economizer section. The use of the closed heat exchanger CA shown in Fig. 2, will give much the same advantages so far as the economizers are concerned, which is obtainable with the open exchanger C shown in Fig. 1; but with the closed heat exchanger, the deaeration must all be accomplished in the heater chamber A and tank $a$ and is less effectively performed than with the apparatus shown in Fig. 1.

The water may be effectively deaerated, and the same economizer advantages attained as with the apparatus of Fig. 1, without subjecting the water to a softening process, by means of the apparatus shown in Fig. 3. The last mentioned apparatus differs from the apparatus shown in Fig. 1 essentially only in that it does not comprise the softening apparatus A-a and has the outlet pipe $D^{10}$ from the low temperature economizer section D' connected directly to the inlet valve $C^2$ in the compartment C' of the heat exchanger C.

While in accordance with the provisions of the statutes I have illustrated and described the best forms of my invention now known to me, it will be apparent to those skilled in the art that changes in form may be made without departing from the spirit of my invention as set forth in the appended claims, and that certain features of my invention may sometimes be used to advantage without a corresponding use of other features.

Having now described my invention what I claim as new and desire to secure by Letters Patent, is:

1. The combination with an economizer divided into low and high temperature sections of a heat exchanger and provisions for passing the raw water through the heat exchanger to the low temperature section of the economizer and from the latter again through the exchanger and thence to the high temperature section of the economizer and means for utilizing the heat contained in the water leaving the low temperature section of the economizer in eliminating air from the water before passing it to the high temperature section of the economizer.

2. The combination with an economizer comprising a low temperature section and a high temperature section of an open heat exchanger comprising two separate water holding compartments open at their upper ends to a common steam space, of means for passing water in divided streams through one of said compartments and thence to the inlet for the low temperature economizer section, and from the latter through the other compartment of the exchanger in divided streams, and thence to the inlet of the high temperature section of the economizer.

3. The combination with an economizer comprising a low temperature section and a high temperature section of an open heat exchanger comprising two separate water holding compartments open at their upper ends to a common steam space, of connections for passing water through one of said compartments and thence to the inlet for the low temperature economizer section and from the latter through the other compartment of the exchanger and thence to the inlet of the high temperature section of the economizer, and vacuum creating means connected to the heat exchanger for withdrawing air therefrom.

4. The combination with hot process water treating apparatus of an economizer comprising low and high temperature sections, a heat exchanger, and connections for passing the water treated through the heat exchanger, the low temperature section of the economizer, said apparatus, the heat exchanger and the high temperature section of the economizer in the order stated.

5. The combination with hot process water treating apparatus of an economizer comprising low and high temperature sections, a heat exchanger, connections for passing the water treated through the heat exchanger, the low temperature section of the economizer, said apparatus, the heat exchanger and the high temperature section of the economizer in the order stated, said heat exchanger comprising two water compartments and a common steam space to which both compartments are open, and means including air exhausting provisions for maintaining a pressure in said steam space appreciably less than the pressure to which the water is subjected in said apparatus.

6. The combination with hot process water treating apparatus, of an economizer comprising low and high temperature sections, a heat exchanger, connections for passing the water treated through the heat exchanger, the low temperature section of the economizer, said apparatus, the heat exchanger, and the high temperature section of the economizer in the order stated, and means for supplying additional heat to the water in said apparatus.

Signed at Philadelphia, in the county of Philadelphia and State of Pennsylvania, this seventh day of July, A. D. 1921.

JOSEPH D. YODER.